W. T. SMITH.
INTERNAL COMBUSTION ENGINE.
APPLICATION FILED SEPT. 30, 1911.
1,176,724.
Patented Mar. 21, 1916.
10 SHEETS—SHEET 1.
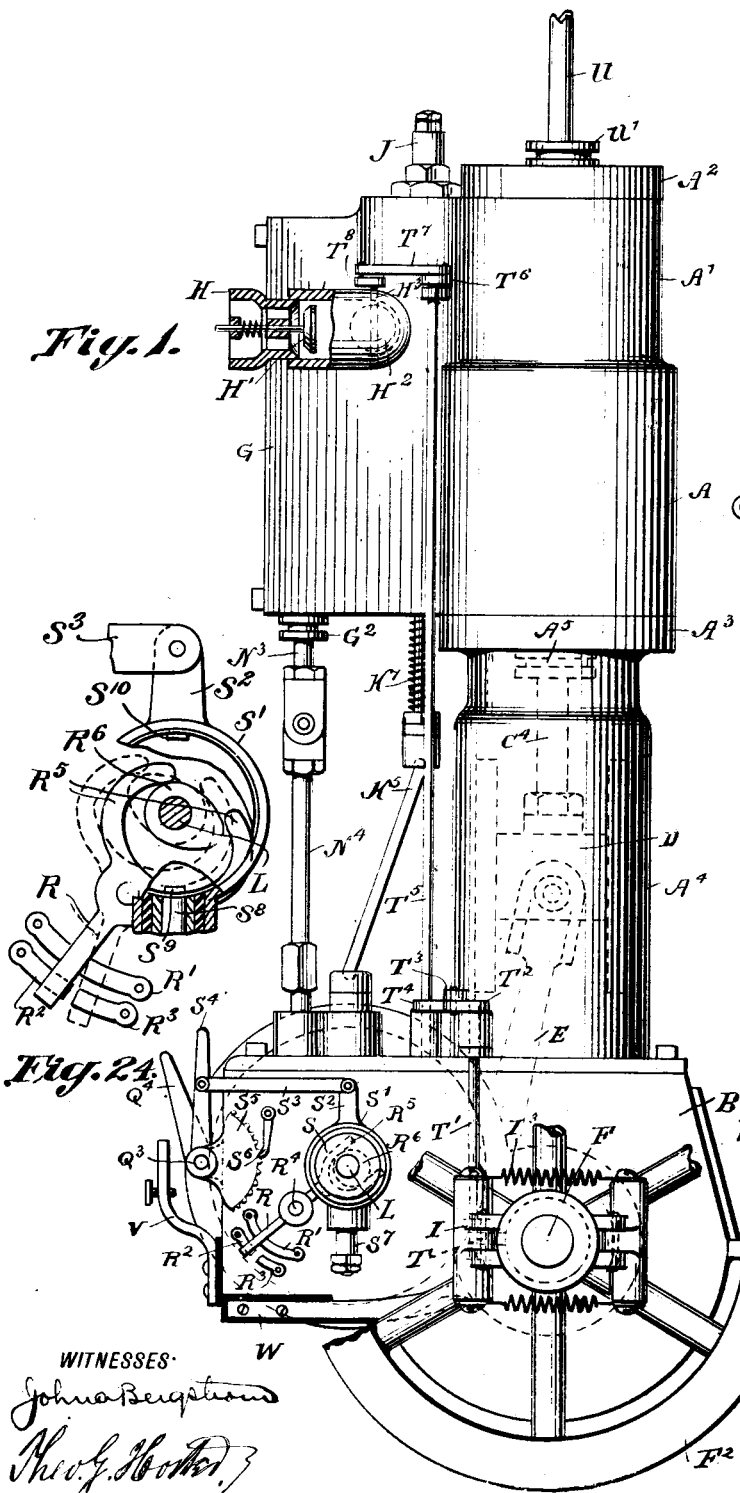
Fig. 1.
Fig. 24.
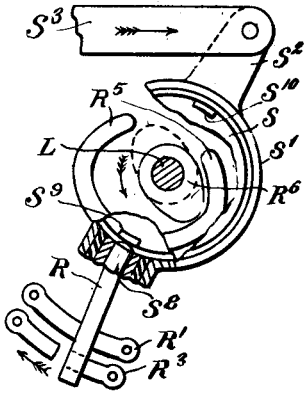
Fig. 26.
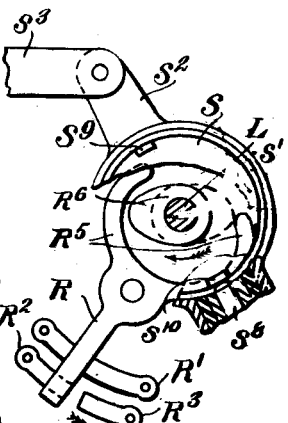
Fig. 25.
WITNESSES
Johna Bengstron
Theo. G. Hooker
INVENTOR
William T. Smith
BY Munn & Co.
ATTORNEYS

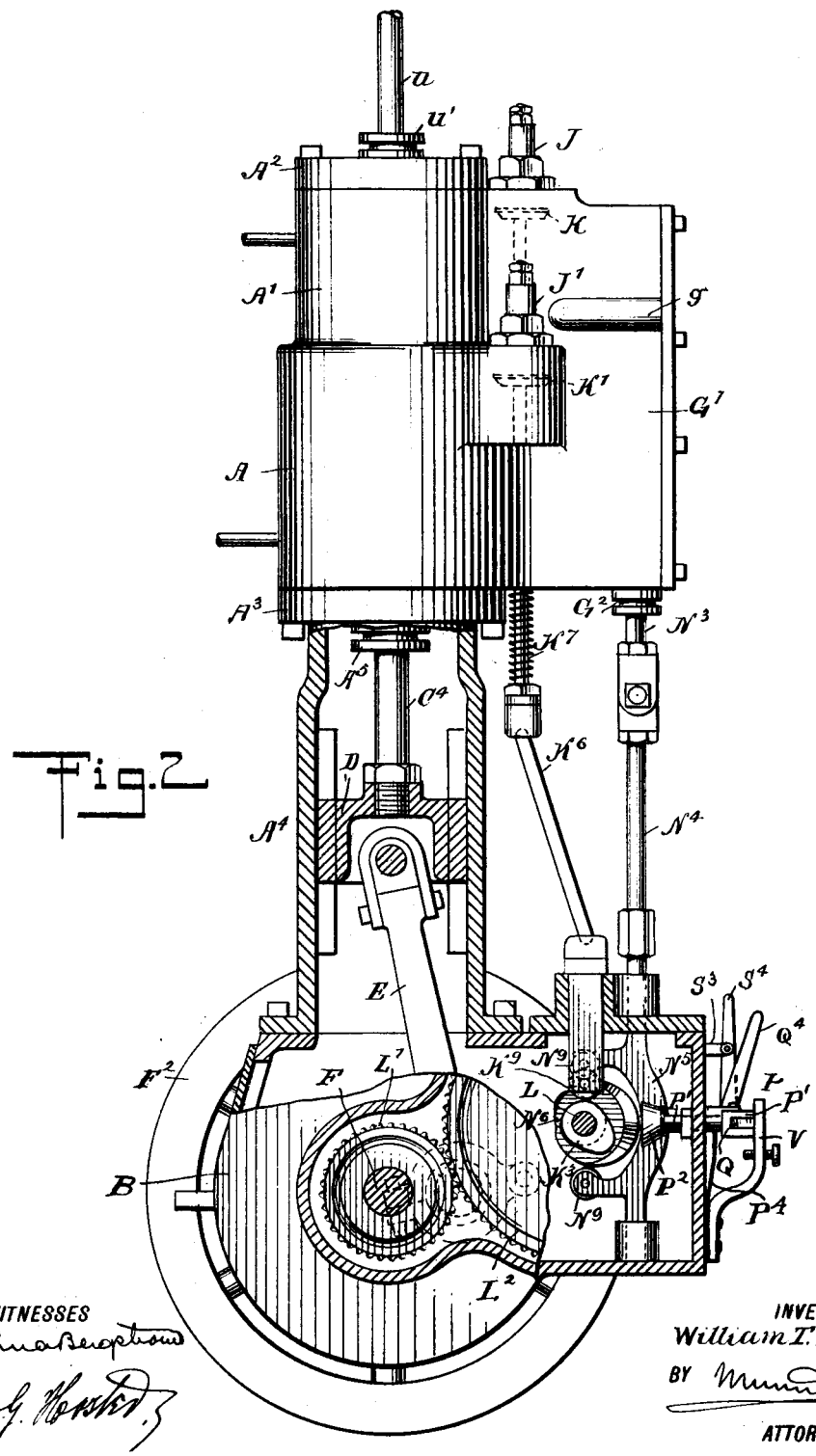

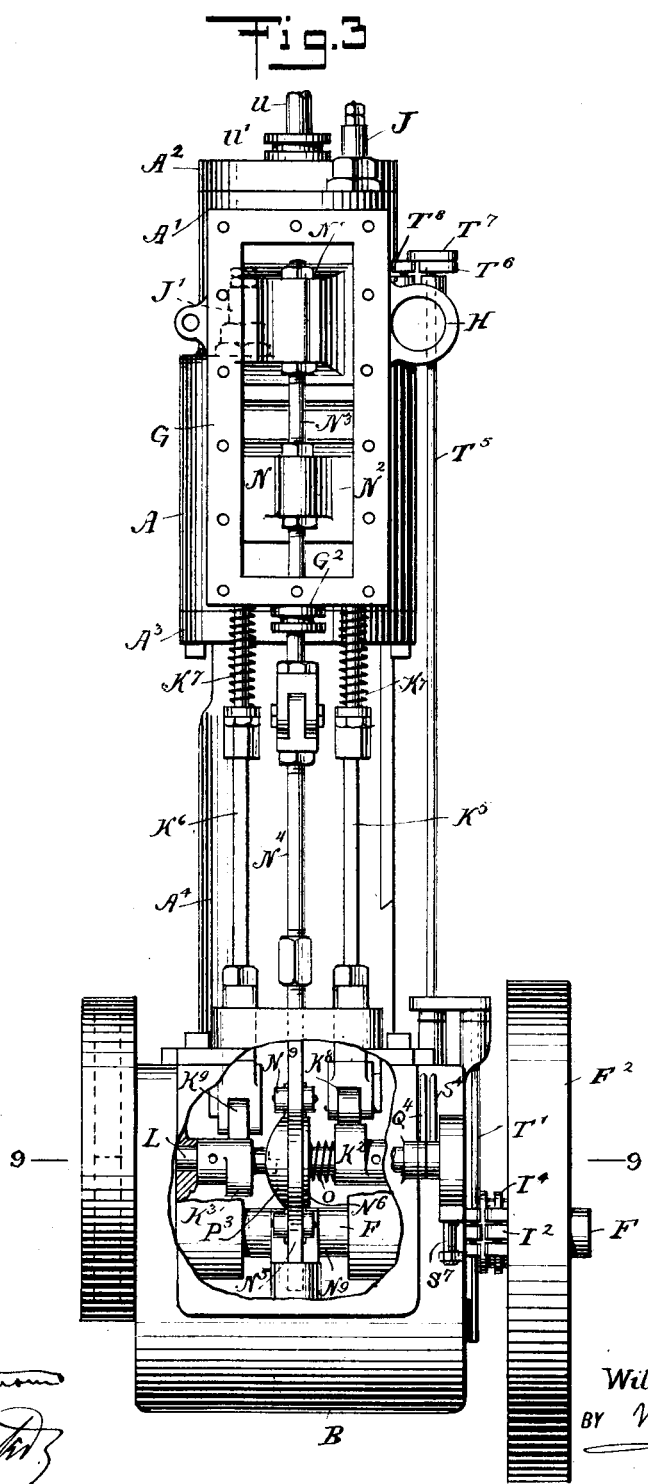

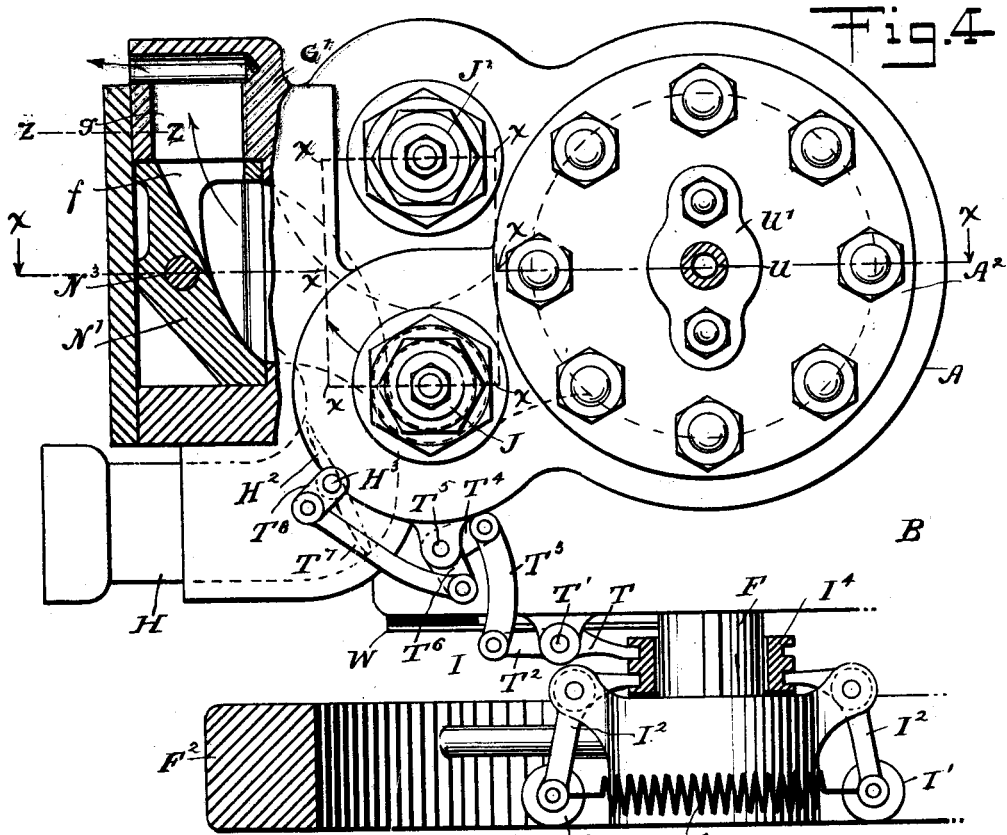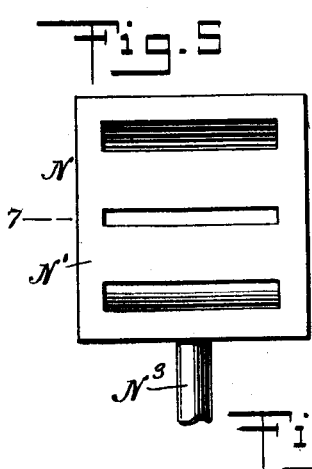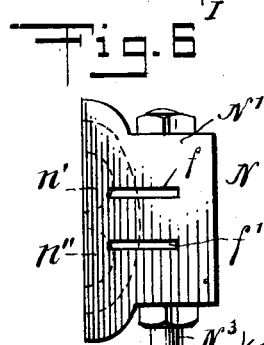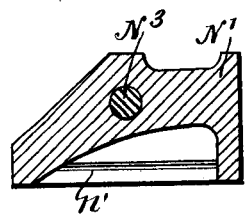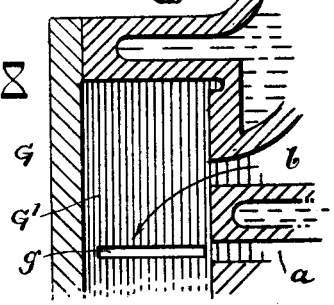

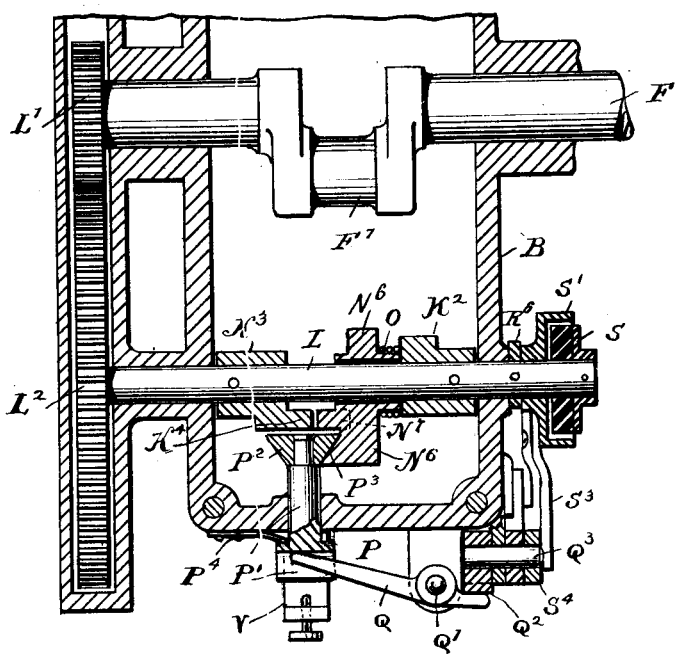
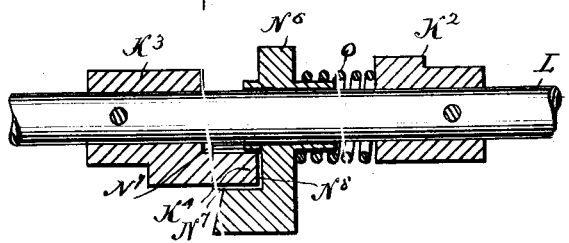
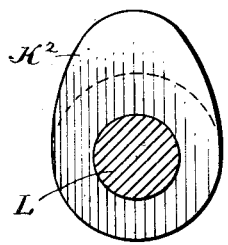
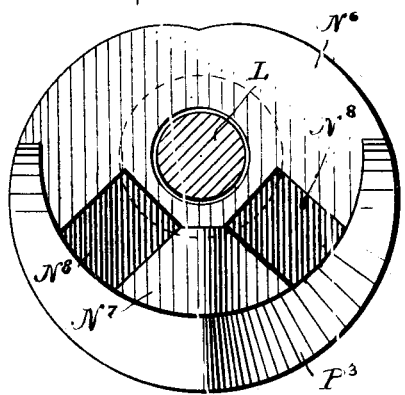
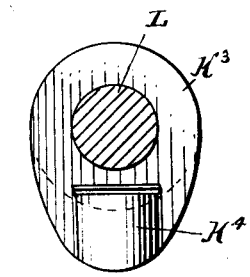

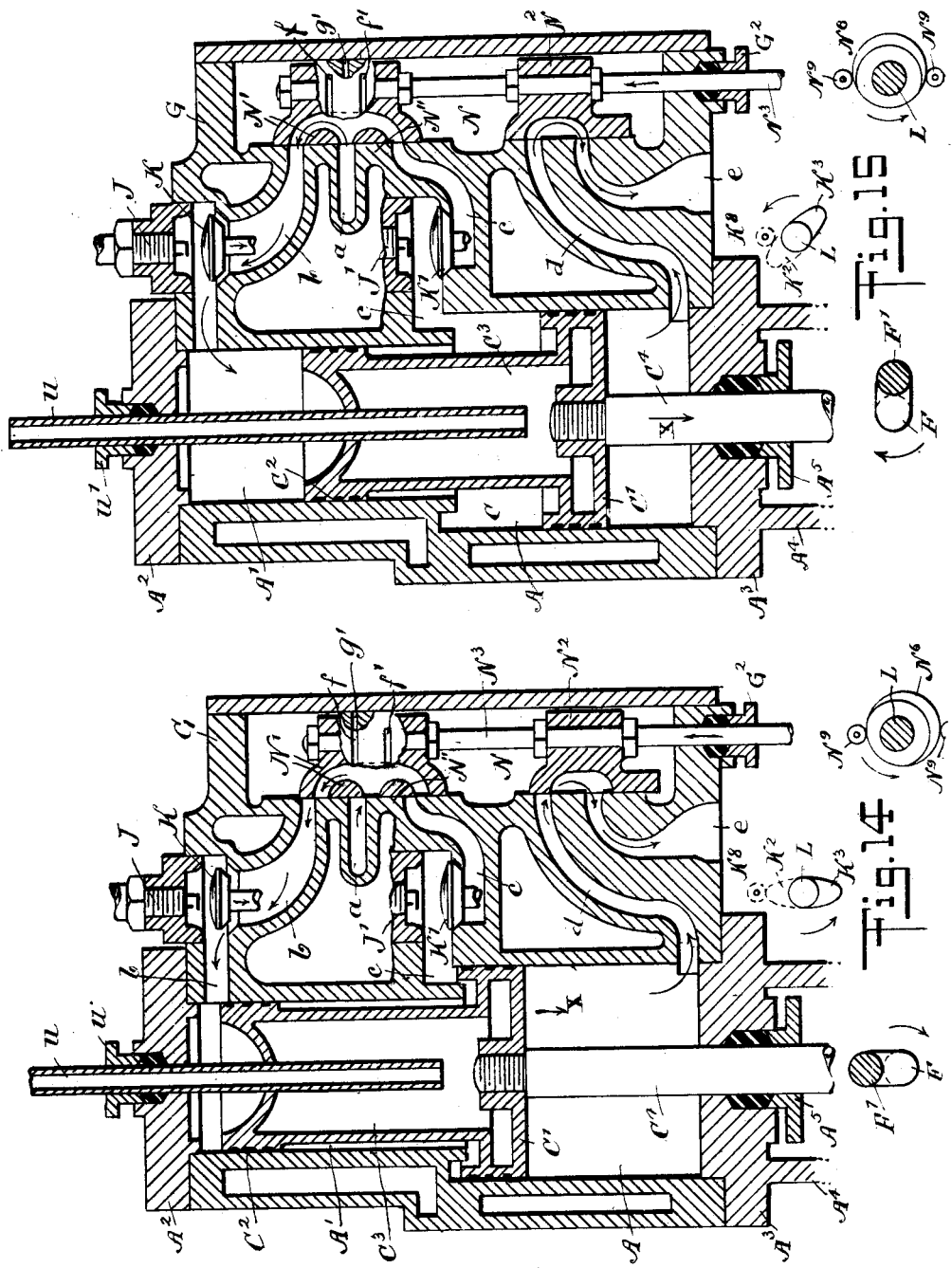

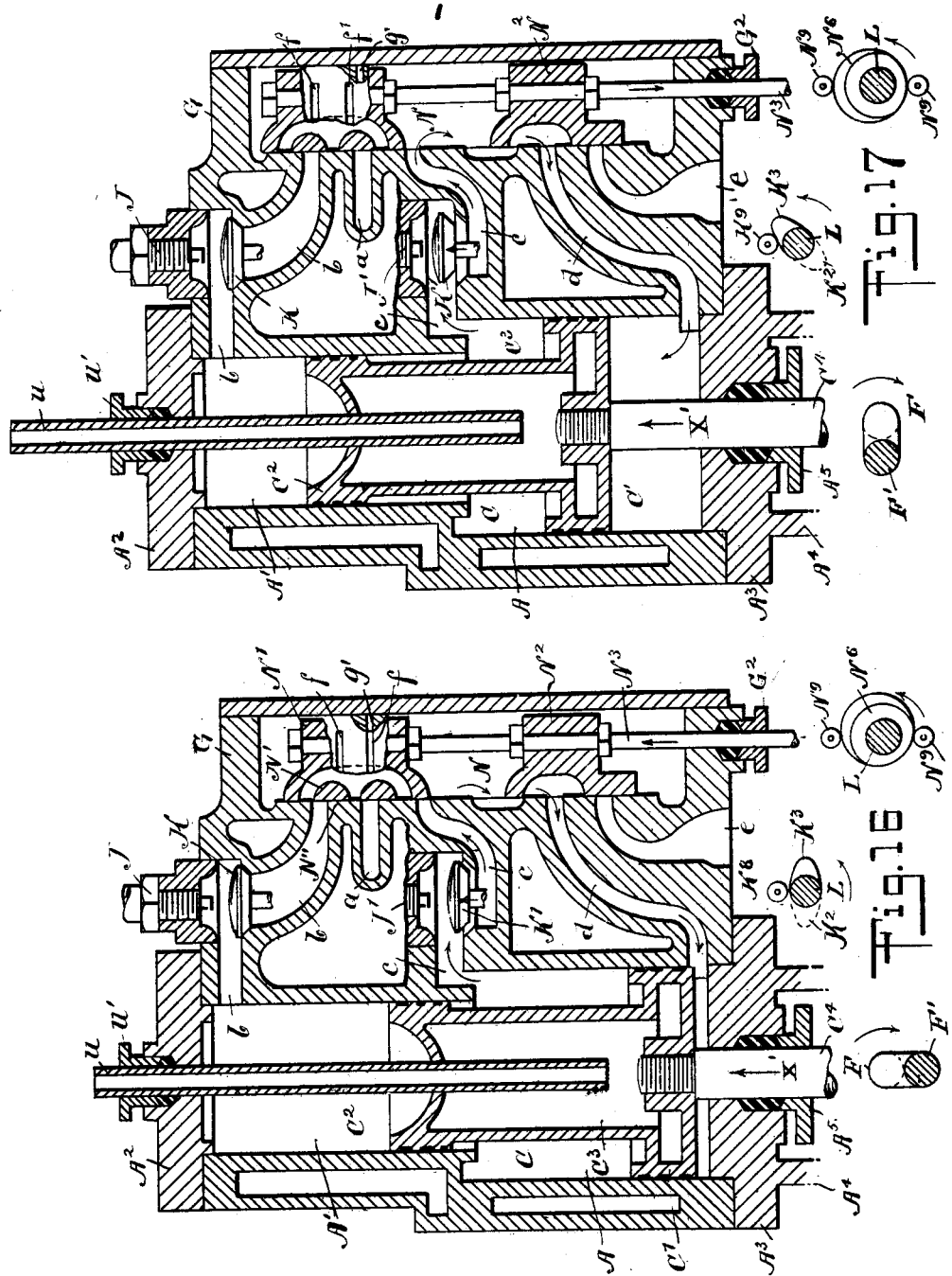

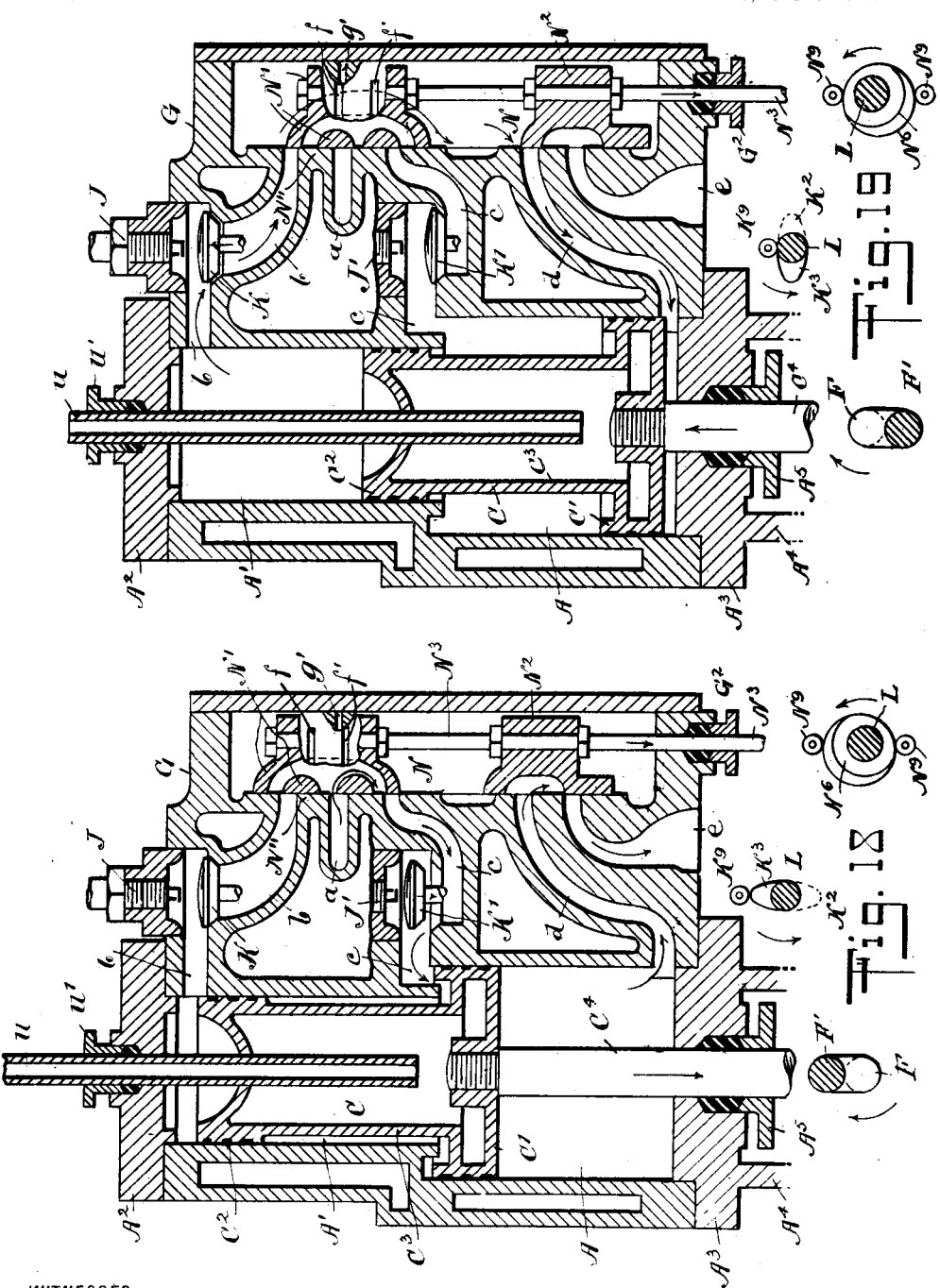

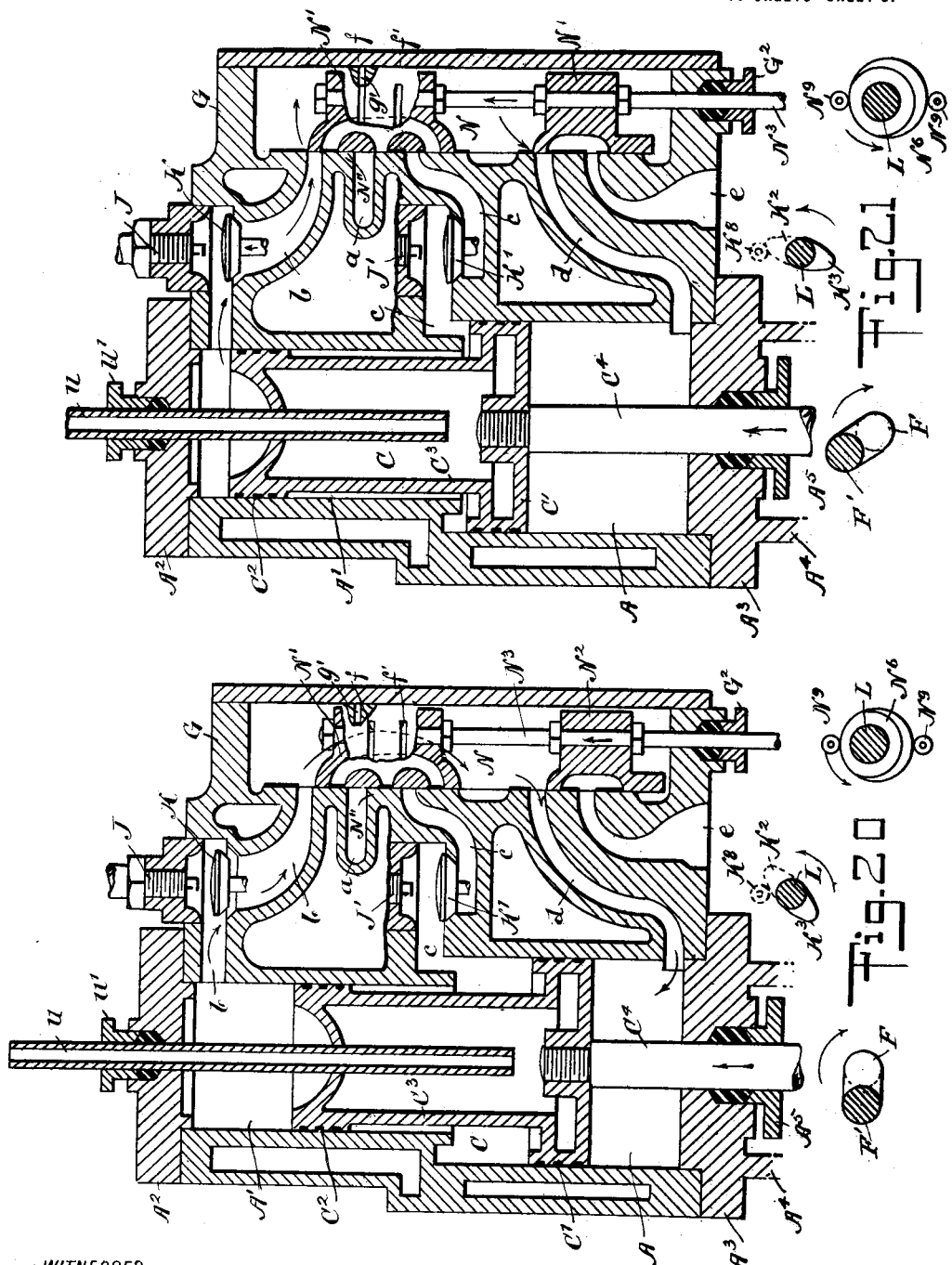

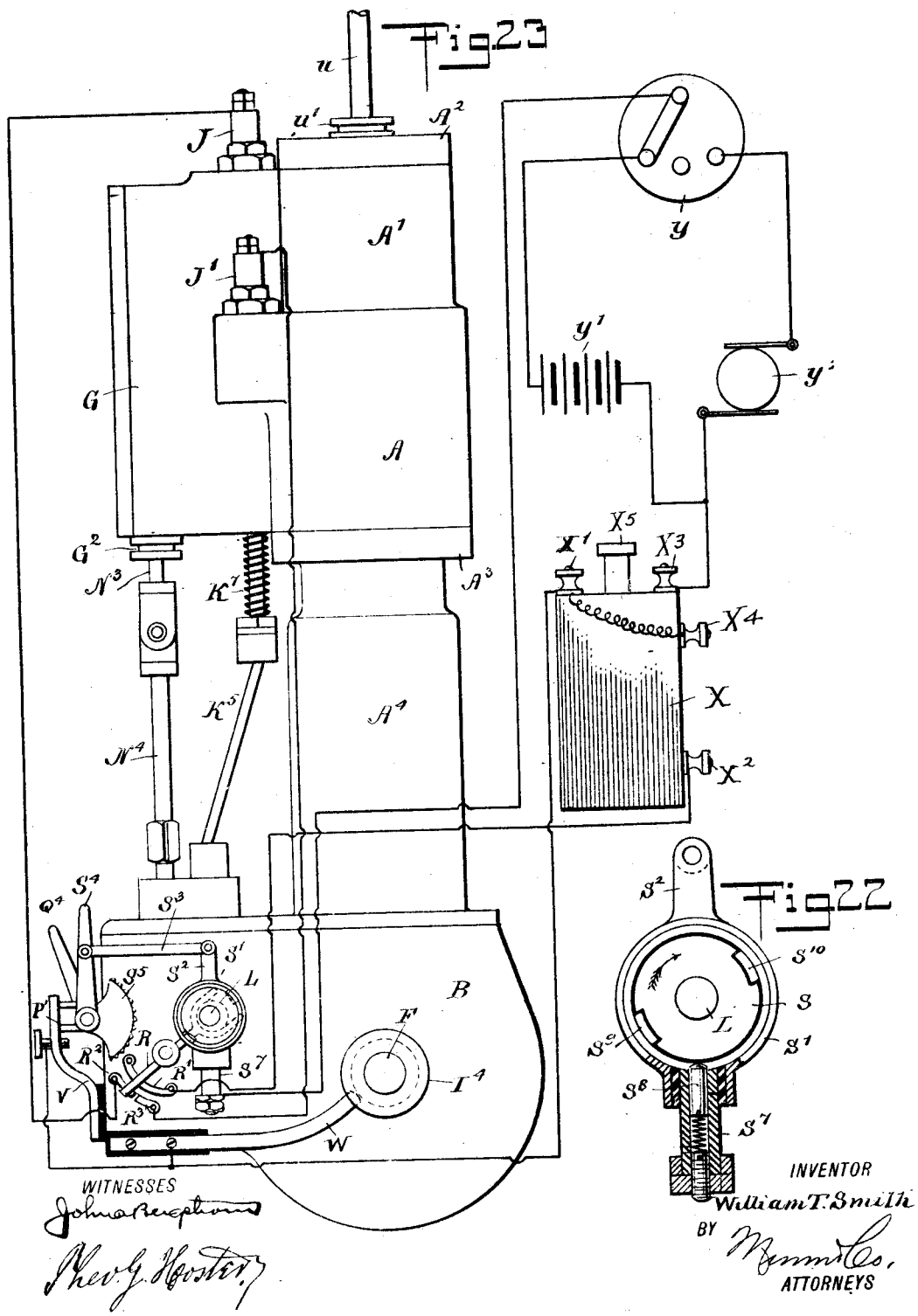

UNITED STATES PATENT OFFICE.

WILLIAM T. SMITH, OF ARLINGTON HEIGHTS, OHIO.

INTERNAL-COMBUSTION ENGINE.

1,176,724. Specification of Letters Patent. Patented Mar. 21, 1916.

Application filed September 30, 1911. Serial No. 652,118.

*To all whom it may concern:*

Be it known that I, WILLIAM T. SMITH, a citizen of the United States, and a resident of Arlington Heights, in the county of Hamilton and State of Ohio, have invented a new and Improved Internal-Combustion Engine, of which the following is a full, clear, and exact description.

The object of the invention is to provide a new and improved internal combustion engine adapted to utilize the products of combustion of the explosive fluid to the fullest advantage, by increasing the number of expansions thereof, to produce continuous impulses with a view to insure a steady, powerful and economical running of the engine by using less than three cylinders.

Another object of the invention is to provide an internal combustion engine, of the character described and illustrated having means for completely exhausting the expanded products of combustion, just prior to the admission of a new charge of explosive fluid.

For the purpose mentioned, use is made of two cylinders in which reciprocates a double piston, means for alternately conducting an explosive fluid into the outer end of the first cylinder and into the inner end of the second cylinder, means for alternately exploding the said fluids in the said cylinders, and means for conducting the products of combustion into the outer end of the second cylinder to use the said products of combustion expansively therein; the first-named means carries a means for exhausting the expanded products of combustion out of the combustion zones of the outer end of the first cylinder and the inner end of the second cylinder, alternately to the atmosphere, and three strokes after said fluid was admitted to said cylinders, while the second-named means carries a means of changing the time and order of operation of the said second-named means; and the third-named means carries a means for exhausting the expanded products of combustion out of the said second cylinder to the atmosphere on successive strokes in one direction of a cycle.

With the above and other objects in view my invention consists of a complete general purpose engine, and the combination, arrangement, and details of construction disclosed in the drawings and specification, and then specifically pointed out in the appended claims.

A practical embodiment of the invention is represented in the accompanying drawings forming a part of this specification, in which similar characters of reference indicate corresponding parts in all the views.

Figure 1 is a front elevation of the internal combustion engine, parts being in section, and parts being broken out; Fig. 2 is a rear elevation of the same, parts being in section; Fig. 3 is a side elevation of the same, parts of the engine bed being broken out and the cover of the valve chest being removed; Fig. 4 is an enlarged plan view of the internal combustion engine, parts being in section; Fig. 5 is a face view of the admission portion of the double slide valve; Fig. 6 is a side elevation of the same; Fig. 7 is a sectional plan view of the same on the lines 7—7 of Fig. 5; Fig. 8 is a sectional side elevation of part of the valve chest, showing the auxiliary exhaust or release port; Fig. 9 is an enlarged sectional plan view of the internal combustion engine at the engine bed, the section being on line 9—9 of Fig. 3, and showing the reversing mechanism in position for reversing the rotation of the engine; Fig. 10 is an enlarged section of the cam shaft, showing one of the puppet valve controlling cams in engagement with the slide valve operating cam to rotate the latter; Fig. 11 is an enlarged face view of the cam for controlling this double slide valve; Fig. 12 is a face view of the cam for operating one of the puppet valves; Fig. 13 is a like view of the cam for operating the other puppet valve and for rotating the slide valve controlling cam; Figs. 14 to 21 are enlarged sectional elevations of the cylinders, piston, controlling valves and cams for actuating the same, the section being taken on lines $x$, $x$, $x$, $x$, $x$, $x$, $x$, $x$, and $z$—$z$, of Fig. 4, looking in the direction indicated, and a section of the crank shaft, the several views showing the parts in different positions during a complete cycle; Fig. 22 is an enlarged sectional side elevation of the electrical reversing switch; Fig. 23 is a diagrammatic view of the internal combustion engine and electrical connections; and Figs. 24, 25, and 26 are enlarged elevations of the electrical reversing switch, showing parts thereof in different positions and its relation to the switch arm, parts being in section and parts being broken out.

The internal combustion engine is provided with two cylinders A and $A^1$, preferably integrally connected with each other and in axial alinement, the cylinder A being somewhat larger in diameter than the cylinder A¹, and the inner or lower end of cylinder A¹, opening into the inner or upper end of cylinder A, as plainly indicated in Figs. 14 to 21. Cylinders A and A¹ are shown in Figs. 1, 2 and 3 disposed vertically, but they may be arranged horizontally as in Figs. 14 to 21, and the upper or outer end of the cylinder A¹ is closed by a cylinder head A² and the lower or outer end of the cylinder A is closed by a cylinder head A³ provided with a guideway A⁴ mounted on the engine bed or casing B.

In the cylinders A and A¹ is mounted to reciprocate a double piston C having the piston heads C¹, and C² connected by a shank C³, the piston head C¹ slidingly engaging the interior wall of cylinder A, and the piston head C² slidingly engaging the interior wall of cylinder A¹.

The piston C is connected at the piston head C¹ with a piston rod C⁴ extending through a stuffing box A⁵ in the cylinder head A³, and the said piston rod C⁴ is connected with a crosshead D mounted to slide in the guideway A⁴ and said crosshead D is connected by a pitman E with a crank F¹ on a shaft F, journaled in suitable bearings arranged on the engine bed or casing B. The shaft F is provided with a pulley or a flywheel F² for transmitting the rotary motion of the shaft to machines.

On the cylinders A and A¹ is arranged a valve chest G provided with an admission port $a$, a port $b$ connecting the upper or outer end of the cylinder A¹ with the chest G, a port $c$ connecting the inner or upper end of the cylinder A with the chest G, a port $d$ connecting the lower or outer end of the cylinder A with the chest G, and ports $e$ and $g$ each connecting the chest G with the atmosphere or exhaust pipes leading thereto.

The admission port $a$ is connected with an explosive fluid supply chamber opening into the pipe H connected with a suitable source of explosive fluid and provided with a spring pressed suction valve H¹ and a controlling valve H² actuated from a governor I mounted on the crank shaft F and of any approved construction, so as to control the amount of the explosive fluid that passes into the cylinders A and A¹ so that the engine may run at all times at a normal rate of speed.

In the ports $b$ and $c$ are arranged igniting devices J and J¹ of which the igniting device J serves to ignite the explosive fluid in the upper or outer end of the cylinder A¹, while the igniting device J¹, serves to ignite the explosive fluid in the upper or inner end of the cylinder A, as hereinafter more fully explained.

The ports $b$ and $c$ opening into respective cylinders A¹ and A, when properly proportioned serve as mixing chambers adapted to preheat new fluid admitted into said cylinders by the residue heat retained therein when the engine is running and thus help distil the volatile matter of said new fluid.

In the ports $b$ and $c$ are also arranged puppet valves K and K¹ controlled by cams K² and K³ secured on a cam shaft L journaled in the engine bed or casing B and driven from the crank shaft F by gear wheels L¹ and L² secured on the crank shaft F and the cam shaft L, respectively, as plainly indicated in Figs. 2 and 9. The gear wheels L¹ and L² are proportioned one to two, so that the cam shaft makes one revolution for every two revolutions of the crank shaft F.

In the valve chest G is arranged a double slide valve N having the valves N¹ and N², of which the valve N¹ controls the admission port $a$ and the ports $b$, $c$, and $g$, while the valve N² controls the ports $d$ and $e$. The valve N¹ is provided with ports $f$ and $f¹$ adapted to alternately connect the cavity in the valve N¹ with the port $g$ formed in one side G¹ of the chest G and leading to the atmosphere, and with bridges $n'$ and $n''$ adapted to form closures for the ports $a$, $b$, and $c$ whereby the exhausting expanded products of combustion are kept from mixing with the unexploded mixture in port $a$ about to be introduced into one of the cylinders.

The ports $f$, $f¹$, and $g$ serve as auxiliary exhaust or relief ports for the escape of the expanded products of combustion from the upper ends of the cylinders A and A¹, just prior to the admission of new charges therein, the expanded products of combustion passing by way of the ports $c$, $f¹$, and $g$ from the cylinder A and by way of the ports $b$, $f$, and $g$ from the cylinder A¹ and in either case by way of the cavity in the slide valve N¹.

The slide valve N² is provided with a cavity adapted to register at its ends with the ports $d$ and $e$, while the slide valve N¹ is provided with a cavity adapted to register at its ends and at the middle with the ports $a$, $b$, and $c$, as will readily be understood by reference to Figs. 14 to 21.

The valves N¹ and N² are secured to a valve stem N³ passing through a stuffing box G² in the chest G to connect at its outer end with the shank N⁴ of a yoke N⁵ engaging a cam N⁶ mounted to rotate loosely on the cam shaft L and pressed on by a spring O toward the cam K³, while the latter is provided with an offset K⁴ adapted to engage opposite sides of a driving lug N⁷ formed on one face of the cam N⁶ so as to rotate the cam N⁶ by the cam K³, in either direction. The cam N⁶ is provided adjacent the sides of the lug N⁷ with recesses N⁸ for engagement by the terminal of the offset K⁴ to prevent the cam N⁶ from running ahead when passing dead center positions.

When it is desired to rotate the engine in a reverse direction, the cam $N^6$ is temporarily shifted to the right by a shifting mechanism P against the tension of the spring O, to disengage the lug $K^4$ from the corresponding side of the lug $N^7$, to hold the double slide valve N temporarily at a stand-still until the lug $K^4$ can engage the other side of the lug $N^7$, to cause a reversal of the rotation of the engine. The reversing mechanism will be described later in detail.

When the engine is running and the several parts in the position shown in Fig. 14, then the upper or inner end of the cylinder A is filled with compressed explosive fluid mixture which is now ignited by the igniting device $J^1$ so that the force of the explosion causes the double piston C to travel downward in the direction of the arrow X. During this downward movement of the piston C, the puppet valve $K^1$ is closed while the puppet valve K is open and the admission port $a$ is connected by the valve $N^1$ with the port $b$ to allow the explosive fluid mixture to pass from the port $a$ into the cavity in the underside of the valve $N^1$ and then into and through port $b$ and into the upper or outer end of the cylinder $A^1$. It is understood that the port $a$ is connected to a source of explosive fluid mixture supply.

The products of combustion in the lower or outer end of the cylinder A pass by way of the ports $d$ and $e$ to the atmosphere. During this downward movement of the piston C in the direction of the arrow $x$ the double slide valve N moves gradually upward to fully connect the ports $a$ and $b$ with each other and likewise the ports $d$ and $e$, as will be readily understood by reference to Fig. 15, and when the piston C reaches the end of its stroke (see Fig. 16) then the puppet valve K is closed, the puppet valve $K^1$ opens, and the double slide valve N assumes the position shown in Fig. 16 to allow the products of combustion in the upper or inner end of the cylinder A to pass through the port $c$ into the chest G and by way of the cavity under valve $N^2$ into the port $d$ and into the lower or outer end of the cylinder A to expand therein and exert a pressure against the piston head $C^1$ to force the piston C on the return or upward stroke. During this upward or return stroke of the piston C the explosive fluid mixture in the upper or outer end of the cylinder $A^1$ is compressed and the products of combustion from the upper or inner end of the cylinder A are completely passed into the lower or outer end of the cylinder A as previously mentioned.

When the piston C reaches the end of its upward or return stroke then an explosion of the compressed explosive fluid mixture takes place in the upper or outer end of the cylinder $A^1$ by the igniting device J so that the piston C is forced downward on the second stroke, and during this downward stroke the slide valve N moves downward to connect the port $a$ with the port $c$ to recharge the upper or inner end of the cylinder A with explosive fluid mixture. During this second downward stroke of the piston C the valve $N^2$ moves downward to connect the port $d$ with the port $e$ to allow the expanded products of combustion in the lower or outer end of the cylinder A to pass to the atmosphere. When the piston C reaches the end of its second downward stroke, the slide valve N has moved sufficiently far downward to open the ports $b$ and $d$ to allow the products of combustion in the upper or outer end of cylinder $A^1$ to pass into the lower or outer end of the cylinder A whereby the products of combustion exert a pressure on the piston head $C^1$, to force the latter upward on its second return stroke, and during this upward movement the previously drawn in charge of explosive fluid mixture in the upper or inner end of the cylinder A is compressed as the puppet valve $K^1$ is now closed and the port $a$ is disconnected from the port $c$.

When the piston C reaches the end of its second upward or return stroke then the compressed explosive fluid mixture in the upper or outer end of cylinder A is ignited by the igniting device $J^1$ and the above described operation is repeated, that is, the piston C is forced downward by the pressure against the upper face of the piston head $C^1$ and during this downward movement the port $a$ is connected with the port $b$ to allow a new charge to pass into the upper or outer end of the cylinder $A^1$, while the products of combustion in the lower or outer end of the cylinder A are discharged to the atmosphere as before explained.

From the foregoing it will be seen that each reciprocation of the double piston C is caused by the expansion after ignition of fluid, whether introduced into either cylinder A or $A^1$. In other words, each movement of the piston C in one direction is caused by the force of an exploded fluid mixture in the cylinder A or $A^1$, and each movement of the piston C in an opposite direction is caused by the expansion of the products of combustion from a previous explosion. During this movement of the slide valve N the auxiliary exhaust or relief ports $f$ and $f^1$ are alternately connected to the combustion zones of the cylinders A and $A^1$ so that the remaining expanded products of combustion in the said combustion zones or clearance spaces of the cylinders A and $A^1$ can readily escape to the atmosphere.

Fig. 21 illustrates the position of the piston C and the valve $N^1$ at about the time the port $f$ is opening to port $g$ to allow the expanded products of combustion to pass out of the combustion zone of cylinder $A^1$ into the cavity under said valve $N^1$ and out through the said ports $f$ and $g$ to the atmosphere, while Fig. 18 serves to illustrate the position of the same valve and piston at the end of the period during which the expanded products of combustion were emptied out of cylinder A by way of the same cavity, but through the ports $f$ and $g$ to the atmosphere, and in both cases during only a fractional part of a stroke. See Fig. 4.

In case the engine may run too fast, the admission end of the supply chamber which is adapted to contain a charge of fluid admitted through the pipe H, is throttled by the valve $H^2$ controlled by the governor I attached to the crank shaft F.

As shown in the drawings the puppet valves K and $K^1$ are provided with stems $K^5$ and $K^6$, pressed on by springs $K^7$, and the stems $K^5$ and $K^6$ are provided with anti-friction rollers $K^8$ and $K^9$ in peripheral engagement with the cams $K^2$ and $K^3$ respectively. The yoke $N^5$ connected to the double slide valve N is provided with anti-friction rollers $N^9$ in peripheral engagement with the top and bottom of the cam $N^6$ to cause a proper up and down sliding of the said double slide valve N for the purpose above described and shown in Figs. 14 to 21. The yoke $N^5$ is mounted to slide in suitable bearings arranged on the engine bed or casing B. It is obvious by reference to Figs. 14 to 21 that the piston C divides the cylinders A and $A^1$ into chambers, each with only one channel opening thereinto and that fluid will pass into and out of said chambers through their respective channels; and that the expanding fluid will pass out of cylinder $A^1$ as the piston C moves in the direction indicated in Figs. 19, 20 and 21 while the puppet valve K is open, and pass into said cylinder $A^1$ while said puppet valve K is still open during the admission stroke indicated in Figs. 14 and 15, and likewise expanding fluid will pass out of cylinder A, and new fluid pass into said cylinder A while the puppet valve $K^1$ is open and the piston is moving in the direction indicated in Figs. 16 and 17, in one case, and Fig. 18 in the other. In other words one of the puppet valves K or $K^1$ is open while the other is closed during two strokes of the piston C in succession, alternately.

The reversing mechanism P, previously mentioned, consists of a pin $P^1$ mounted to slide transversely in the engine bed B (see Figs. 2 and 9) and on the inner end of the said pin $P^1$ i mounted a bevel anti-friction roller $P^2$ adapted to engage a segmental face cam $P^3$ formed on the face of the cam $N^6$, and the outer end of the pin $P^1$ is provided with a head, in which is a groove for the insertion of one end of a lever Q, and said head of the pin $P^1$ provides an abutment which is pressed on by a spring $P^4$ to normally hold the pin $P^1$ in an outermost position and the anti-friction roller out of engagement with the face cam $P^3$. Fig. 2 indicates the roller $P^2$ in normal inactive position.

A lever Q is fulcrumed on the outside of the engine bed B at $Q^1$ and one end of it presses in the groove previously mentioned on the outer end of the pin $P^1$, while the other end of the said lever Q engages a cam $Q^2$ mounted to turn on a stud $Q^3$ held on the engine bed B. The cam $Q^2$ is provided with a handle $Q^4$ under the control of the operator for turning the cam $Q^2$ with a view to impart a swinging motion to the lever Q to push the pin $P^1$ inward against the tension of its spring $P^4$, and when the pin $P^1$ is forced inward its anti-friction roller $P^2$ engages the face cam $P^3$, so that the cam $N^6$ is shifted to the right against the tension of its spring O. When this takes place the driving lug $N^7$ of the cam $N^6$ is moved out of engagement with the driving lug $K^4$ of the cam $K^3$, hence the cam $N^6$ is held temporarily stationary and with it the valve N for reversing purposes, as hereinafter more fully explained.

It is understood that the total width of the cam $N^6$ including the approximate semicircular face of the cam $P^3$ at its widest point, is greater than the distance between the anti-friction roller $P^2$ on one side, and the cam $K^2$ on the other, hence the cam $N^6$ cannot make a complete revolution when in engagement with said roller $P^2$, and after the driving lug $N^7$ of the cam $N^6$ has moved out of engagement with the driving lug $K^4$ of the cam $K^3$ the spring O frictionally binding against said cam $N^6$ will keep it in engagement with the roller $P^2$ until the rotation of the shaft L is reversed, and then the cam $N^6$ turns with the said shaft L owing to the turning of the cam $K^2$ with the shaft L, and the tension of the compression spring O bearing sufficiently hard against the cams $K^2$ and $N^6$ to carry the cam $N^6$ along in the reversed direction, and as the cam $N^6$ revolves the segmental face cam $P^3$ disengages from the anti-friction roller $P^2$, then the latter returns to its outermost position owing to the action of the spring $P^4$, allowing the spring O to return the cam $N^6$ to its normal position, and the opposite side of the lug $N^7$ of said cam $N^6$ will fully engage the lug $K^4$ of the cam $K^3$. In other words, the anti-friction roller $P^2$ is manually controlled to cause cam $N^6$ to become wedged between said anti-friction roller $P^2$ and the cam $K^2$, in this case before said cam $N^6$ reaches the position shown in Fig. 15, and said cam $N^6$ is automatically controlled as it returns to its normal position. The driving lug $K^4$ of cam $K^3$ is always in a position farther advanced than that shown in Fig. 17 before ignition takes place, at a predetermined speed of the engine, as hereinafter more fully described, so that said lug $K^4$ will reëngage the other driving face of the lug $N^7$, when the cam $N^6$ starts to move.

It is further to be understood that in practice the operator, after imparting an inward swinging motion to the lever Q as above described holds the handle $Q^4$ in a vertical position for about four strokes of the engine prior to releasing it, so as to allow the antifriction roller $P^2$ to become engaged by the segmental face cam $P^3$ formed on the cam $N^6$, to shift the latter as above described.

In order to control the igniting devices J and $J^1$, use is made of a switch arm R, fulcrumed on the engine bed B and adapted to engage segmental contacts $R^1$, $R^2$ and $R^3$ held insulated on said engine bed B, and of which the contact $R^1$ is connected with a source of electricity, and the contacts $R^2$ and $R^3$ are connected with the igniting devices J and $J^1$ respectively.

The contact arm R is fulcrumed at $R^4$ (see Fig. 1) on the engine bed B and its upper terminal is a fork $R^5$ engaged by a cam $R^6$ secured on the shaft L, so that when the latter is rotated the cam $R^6$ imparts a swinging motion to the switch arm R to move the latter alternately from contact $R^2$ to contact $R^3$ with a view to make electrical connection between $R^1$, $R^2$ and J, and $R^1$, $R^3$ and $J^1$, respectively, so that the igniting devices J and $J^1$ can be operated at the proper time. In reversing the rotation of the engine as previously explained, the timed relation of the controlling means for the igniting devices has to be reversed relatively thereto, and for this purpose, and in order to control the time during which the electric current flows, use is made of a reversing switch arranged as follows; on the cam shaft L (see Figs. 1 and 9) is secured a disk S of insulating material and having metal contacts in its peripheral face connected to the said cam shaft L. The shell $S^1$ is provided with an upwardly extending arm $S^2$ connected by a link $S^3$ with a lever $S^4$ fulcrumed on the stud $Q^3$ previously mentioned, so that the operator on imparting a rocking motion to the lever $S^4$ turns the shell $S^1$ to change its relative position to the disk S.

In order to hold the shell $S^1$ in adjusted position, use is made of a locking device consisting preferably of a toothed segment $S^5$ engaged by a pawl $S^6$ fulcrumed on the engine bed B.

On the shell $S^1$ (see Fig. 22) is arranged an insulated binding post $S^7$ carrying a spring pressed contact pin $S^8$ in engagement with the insulated peripheral face of the disk S, the said face having diametrically opposite contacts $S^9$ and $S^{10}$ grounded or electrically connected with the cam shaft L, said contacts $S^9$ and $S^{10}$ being alternately engaged by the pin $S^8$ when the shaft L is rotated.

On the engine bed B is held insulated a contact arm V normally engaged by the pin $P^1$ to make electrical contact therewith, the said pin $P^1$ being disengaged from electrical contact with the said arm V whenever the handle $Q^4$ is shifted for reversing the rotation of the engine as previously explained. On the engine bed B is also held an insulated spring contact W controlled by the governor I for reversing purposes, as hereinafter more fully explained.

The contact arm V and the spring contact W are connected with the terminal $X^1$ (see Fig. 23) of a primary coil in the spark coil box X, of any approved construction, and the same wire is also connected with terminal $X^4$ of the secondary coil of the said spark coil box X. The other terminal $X^3$ of the primary coil is connected to one of the poles of a source of electrical energy, such as a battery $y^1$ or a generator $y^2$, and the other pole of such source of electrical energy $y^1$ or $y^2$ is connected to the contact points of a switch $y$ connected with a binding post $S^7$ in electrical contact with the pin $S^8$. The terminal $X^2$ of the secondary coil in the box X is connected with the switch contact $R^1$ and the other contacts $R^2$ and $R^3$ are connected with the igniting devices J and $J^1$ respectively.

It is understood that the function of the vibrator $X^5$ on the coil box X is to interrupt the flow of the electrical energy through the primary coil to cause or induce a secondary current of high voltage to flow through the secondary coil in said coil box X, and when the spark coil box X is not provided with a safety spark gap, one should be connected to the wire running from the terminal $X^4$ to contacts V and W, so as not to injure the coils in the coil box X should the lever $S^4$ not be actuated properly, as hereinafter explained.

It can be seen by reference to Figs. 14 to 21 that the igniting devices J and $J^1$ have been operated in the following order $J^1$ then J, and it can also be seen that when the reversing mechanism that controls the slide valve N has been operated that said valve N will stop moving before it assumes the position shown in Fig. 15, at which time the lug $K^4$ is out of engagement with the lug $N^7$ of cam $N^6$.

Fig. 19 indicates the position of the piston C and the valve N when the segmental cam $P^3$ formed on the face of the cam $N^6$ will start to engage the roller $P^2$ carried on the end of the pin $P^1$, when the reversing mechanism is shifting, and the electric contact between the pin $P^1$ and the arm V will be broken, so that the igniting device J will be the last one operated. The double slide valve N now being in a position to exhaust an exploded charge of combustible fluid from cylinder $A^1$ when said valve starts to move in an opposite direction, it becomes necessary to reverse the order of operation of the igniting devices J and $J^1$ and to provide a means for operating the particular igniting device that will cause a reversal of the rotation of the engine, when the governor I has caused the sliding collar $I^4$ to make contact with the spring contact W, to close the electric circuit at a predetermined reversing speed, as will now be explained.

In order to reverse the order of operation of the igniting devices J and $J^1$ the operator moves the handle $S^4$ in a direction opposite to the direction of rotation of the disk S, to cause the position of the contact pin $S^8$ of the shell $S^1$ to be changed, relatively to the contacts $S^9$ and $S^{10}$ of the disk S.

The cam $R^6$ is adapted to give an intermittent motion to the arm R as it engages the sides of the fork $R^5$ of said arm alternately, and when the cam $R^6$ is rotating in the direction indicated on Fig. 22, the contact $S^9$ will make contact with the pin $S^8$ just as the arm R is moving in contact with the contacts $R^1$ and $R^3$ and the cam $R^6$ will move about 30 degrees of a circle, after which said arm will remain temporarily at a stand-still while the cam $R^6$ is moving about 60 degrees of a circle, and while the cam $R^6$ is moving about 90 more degrees of the circle the arm R will move from contact with said contacts $R^1$ and $R^3$ into contact with the contacts $R^1$ and $R^2$, where it will remain temporarily at a stand-still while the cam $R^6$ is moving about 180 more degrees of the circle, and during which time the contact $S^{10}$ will have made contact with the said pin $S^8$.

When the handle is shifted to the left to reverse the indicated rotation of the engine, ignition will take place at an earlier period, owing to the pin $S^8$ being placed in position to be contacted at an earlier period, at which time either the contact $S^9$ will make contact with said pin $S^8$ while the arm R is just moving out of contact with contacts $R^1$ and $R^2$, or the contact $S^{10}$ will make contact with said pin $S^8$, after the cam $R^6$ has moved 180 degrees of a circle, during which time said cam $R^6$ has caused the arm R to be moved into contact with contacts $R^1$ and $R^3$ and back again into contact with said contacts $R^1$ and $R^2$.

When the engine is running in a direction opposite to the indicated rotation the intermittent motion of the arm R will be the same, but the said arm R will contact the contacts $R^3$ and $R^2$ in reversed order, and the handle will be moved to the right to reverse the rotation of the engine.

From Fig. 24 it is obvious that the contacts $R^2$ and $R^3$ will be contacted alternately by the arm R, when said arm R moves from either the position shown in full lines or the position shown in dotted lines, while the cam $R^6$ is making each revolution. Fig. 25 shows the shell $S^1$ in a position to cause the pin $S^8$ to contact the contacts $S^9$ and $S^{10}$ alternately, while the arm R is in contact with the contacts $R^1$ and $R^2$, as the cam $R^6$ moves in the direction indicated, from the position shown in dotted lines to that shown in full lines, to control a particular igniting device, for reversing purposes. Fig. 26 shows the shell $S^1$ in a position to cause the pin $S^8$ to contact the contacts $S^9$ and $S^{10}$ alternately, while the arm R is in contact with the contacts $R^1$ and $R^3$, as the cam $R^6$ moves in the direction indicated, from the position shown in dotted lines to that shown in full lines, to control another igniting device, to cause the engine to run in the direction indicated on the drawings, for reversing purposes.

The governor I, previously mentioned and illustrated in Figs. 1, 3 and 4 is constructed as follows:—Weights $I^1$ are mounted on bell crank levers $I^2$ fulcrumed on the hub of the wheel $F^2$ connected with each other by springs $I^3$, and said levers $I^2$ engage a double grooved shifting collar $I^4$ mounted to slide loosely on the crank shaft F. The shifting collar $I^4$ is engaged by an arm T mounted on the lower end of a rod $T^1$ journaled in suitable bearings arranged on the engine bed B, and on the upper end of said rod T is secured an arm $T^2$ connected by a link $T^3$ with an arm $T^4$ secured to a vertical rod $T^5$ journaled on the engine bed B and the cylinder $A^1$. On the upper end of the rod $T^5$ is secured an arm $T^6$ connected by a link $T^7$ with an arm $T^8$ attached to the stem $H^3$ of the controlling valve $H^2$ so as to open the latter more or less according to the speed of the engine. It is understood that when the engine is running the weights $I^1$ tend to swing outward against the tension of the springs $I^3$ and in doing so the arms $I^2$ carrying the said weights $I^1$ impart movement to the shifting collar $I^4$ which by the connection above described causes a turning of the valve $H^2$ to open the latter more or less according to the speed of the engine.

In order to reverse the rotation of the engine the operator first moves the lever $Q^4$ into a vertical position to disconnect the cam $N^6$ from the driving cam $K^3$, as previously explained, this holds the slide valve N stationary, temporarily. The inward movement of the pin $P^1$ breaks the electric contact between the pin $P^1$ and the contact arm V so that the charge in the cylinder A or $A^1$ is not ignited, as the primary circuit is broken and there is no secondary current as the latter is dependent on the former for its source of supply. The igniting devices therefore are inoperative, and the cams $K^2$ and $K^3$ continue to revolve, thus allowing a charge of the combustible fluid mixture to enter the cylinder A¹, the same being compressed by the piston head C². As electric contact controlling the igniting devices J and J¹ is broken, ignition of the charges in the cylinders A and A¹ does not take place, and the charges are repeatedly compressed and expanded on the upward and downward strokes of the piston C and the speed of the engine is gradually reduced, allowing the shifting collar I⁴ to make contact with the spring contact W. Now as soon as the contact pin S⁸ makes contact with the contact S⁹ or S¹⁰ on the revolving disk S, the corresponding secondary igniting circuit being closed by the switch arm R, ignition of the compressed combustible fluid takes place in this case in cylinder A¹, to insure a reversal of the rotation of the engine.

The above described ignition of the compressed fluid will take place when the piston C is about two-thirds on its way on an upward stroke. It is understood that the lever S⁴ has been moved in the direction that will change the relation of the revolving contacts S⁹ and S¹⁰ to the contact S⁸ held insulated in the shell S¹ connected to said lever S⁴ by the link S³. When the lever S⁴ is held in this described position pin S⁸ will make contact with either contact S⁹ or S¹⁰ when the piston has reached the above mentioned point of about two-thirds on its upward stroke.

Normally the arm S² of the shell S¹ and the lever S⁴ are in a vertical position, as shown in Figs. 1, 2 and 23. The levers Q⁴ and S⁴ are preferably moved together by the operator in a direction opposite to the rotation of the disk S, to cause a reversal of the rotation of the engine, and after this has been accomplished the lever S⁴ is returned to its normal vertical position. Levers Q⁴ and S⁴ can be moved from either direction to a vertical position.

Fig. 1 shows the valve H¹ adapted to close after each charge of combustible fluid has passed through it, and said valve H¹ is provided so that when the engine is reversing its rotation the charges cannot pass from either of the ports *b* or *c* into the port *a* and thence backward into the carbureter or the exhaustion strokes of the engine by way of the pipe H, especially as the valves K and K¹ are operated during this reversing operation, and the charges cannot pass into the chest G owing to the previously described position of the valve N at this time.

The cylinders A and A¹ and the chest G are provided with suitable water jackets, and the double piston C is preferably made hollow, and into it extends a pipe *u* passing through a suitable stuffing box *u¹* in the cylinder head A², to provide an opening for a means (not shown) for allowing a cooling fluid to enter and be withdrawn from the interior of said piston C.

I do not desire to limit myself to the precise details of construction and arrangement above described, as it is obvious that various modifications may be made therein without departing from the essential features of my invention as defined in the appended claims.

What I claim as my invention is:—

1. An internal combustion engine, comprising two cylinders, one opening into the other, a double piston mounted to reciprocate in the said cylinders, a valve chest having an admission port connected with a source of explosive mixture, and ports connecting the said valve chest with the ends of the said cylinders and with the atmosphere, a valve mechanism for controlling the said ports to alternately conduct an explosive mixture into the outer end of the first cylinder and into the inner end of the second cylinder and conducting the products of combustion into the outer end of the second cylinder to use the said products of combustion expansively therein, and igniting devices for alternately igniting the said mixtures in the said cylinders.

2. An internal combustion engine, comprising two cylinders of different diameters and one opening into the other, a double piston mounted to reciprocate in the said cylinders, a valve chest having an admission port connected with a source of explosive mixture, ports connecting the chest with the ends of the cylinders, an exhaust port connecting the valve chest with the atmosphere, slide valves controlling the ends of the ports opening into the valve chest, puppet valves controlling the ports leading to the outer end of the smaller cylinder and into the inner end of the larger cylinder, and means for alternately exploding the said mixture in the said cylinders.

3. An internal combustion engine, comprising two cylinders, one opening into the other, a double piston mounted to reciprocate in the said cylinders, a valve chest having an admission port connected with a source of explosive mixture, and ports connecting the said valve chest with the ends of the said cylinders and with the atmosphere, a valve mechanism for controlling the said ports to alternately conduct an explosive mixture into the outer end of the first cylinder and into the inner end of the second cylinder and conducting the products of combustion into the outer end of the second cylinder to use the said products of combustion expansively therein, igniting devices for alternately igniting the said mixture in the said cylinders, and means for reversing the said valve mechanism and the order of operation of the said igniting devices.

4. An internal combustion engine, comprising two cylinders of different diameters, the small cylinder opening at its inner end into the inner end of the larger cylinder, a double piston mounted to reciprocate in the said cylinders, a valve chest, ports connecting the said cylinders and valve chest and valves controlling the said ports, puppet valves and igniting devices in the ports connecting the outer end of the small cylinder and the inner end of the larger cylinder with the said valve chest.

5. An internal combustion engine, comprising two cylinders of different diameters, the smaller cylinder opening at its inner end into the inner end of the larger cylinder, a double piston mounted to reciprocate in the said cylinders, a valve chest, ports connecting the valve chest with the outer end of the smaller cylinder and the inner and outer ends of the larger cylinder, an admission port, exhaust ports, a double slide valve in the said valve chest controlling the said ports, a puppet valve and an ignition device in the port leading to the outer end of the smaller cylinder, a puppet valve and an ignition device in the port leading to the inner end of the larger cylinder.

6. An internal combustion engine, comprising two cylinders of different diameters, the smaller cylinder opening at its inner end into the inner end of the larger cylinder, a double piston mounted to reciprocate in the said cylinders, a valve chest, ports connecting the valve chest with the outer end of the smaller cylinder and the inner and outer ends of the larger cylinder, an admission port, exhaust ports, a double slide valve in the said valve chest controlling the said ports, a puppet valve and an igniting device in the port leading to the outer end of the smaller cylinder, a puppet valve and an igniting device in the port leading to the inner end of the larger cylinder, an engine shaft connected with the said piston, a cam shaft driven from the said engine shaft, cams on the said cam shaft, actuating means connecting the said cams with the said slide valve and the said puppet valves, and a controlling means including an actuating means on the said cam shaft for controlling the said igniting devices.

7. An internal combustion engine, comprising two cylinders of different diameters, the smaller cylinder opening at its inner end into the inner end of the larger cylinder, a double piston mounted to reciprocate in the said cylinders, a valve chest, ports connecting the valve chest with the outer end of the smaller cylinder and the inner and outer ends of the larger cylinder, an admission port, exhaust ports, a double slide valve in the said valve chest controlling the said ports, a puppet valve and an igniting device in the port leading to the outer end of the smaller cylinder, a puppet valve and an igniting device in the port leading to the inner end of the larger cylinder, an engine shaft connected with the said piston, a cam shaft driven from the said engine shaft, cams on the said cam shaft, actuating means connecting the said cams with the said slide valve and the said puppet valves, a controlling means including an actuating means on the said cam shaft for controlling the said igniting devices, and a manually controlled means for controlling certain of the said cams for reversing the rotation of the said engine shaft.

8. An internal combustion engine, comprising two cylinders of different diameters, the smaller cylinder opening at its inner end into the inner end of the larger cylinder, a double piston mounted to reciprocate in the said cylinders, a valve chest, ports connecting the valve chest with the outer end of the smaller cylinder and the inner and outer ends of the larger cylinder, an admission port, an exhaust port, an auxiliary exhaust port, a double slide valve in the said valve chest controlling the said ports, a puppet valve and an igniting device in the port leading to the outer end of the smaller cylinder, a puppet valve and an igniting device in the port leading to the inner end of the larger cylinder, an engine shaft connecting with said piston, a cam shaft driven from the said engine shaft, actuating means connecting the said cams with the said slide valve and the said puppet valves, controlling means including an actuating means on the said cam shaft for controlling the said igniting devices, a governor on the said engine shaft including a sliding collar, a valve in the said admission port, a contact held insulated from the engine bed, and the said collar and the said valve and the said contact controlled by the said governor.

9. An internal combustion engine, comprising two cylinders of different diameters, the smaller cylinder opening at its inner end into the inner end of the larger cylinder, a double piston mounted to reciprocate in the said cylinders, a valve chest, ports connecting the said cylinders and valve chest, an admission port, an exhaust port, an auxiliary exhaust port, a double slide valve in the said valve chest, and controlling the said ports, puppet valves and igniting devices in the ports connecting the outer end of the smaller cylinder and the inner end of the larger cylinder with the said valve chest, and the said slide valve having ports adapted to register with the said auxiliary exhaust port leading to atmosphere.

10. An internal combustion engine, comprising two cylinders of different diameters, the smaller cylinder opening at its inner end into the inner end of the larger cylinder, a double piston mounted to reciprocate in the said cylinders, a valve chest, ports connecting the said cylinder and valve chest, slide valves controlling the said ports, puppet valves and igniting devices in the ports connecting the outer end of the smaller cylinder and the inner end of the larger cylinder with the valve chest, an engine shaft connected with the said piston, a cam shaft driven from the said engine shaft, valve operating cams on the said cam shaft, means for causing said cams to operate the said slide valves and the said puppet valves, fixed contacts, electrical connections leading from certain of the contacts to said igniting devices, a switch arm arranged to engage said contacts, and means controlled by the cam shaft for actuating the said switch arm.

11. An internal combustion engine, comprising two cylinders of different diameters, the small cylinder opening at its inner end into the inner end of the larger cylinder, a double piston mounted to reciprocate in the said cylinders, a valve chest, ports connecting the said cylinders and the valve chest, slide valves controlling said ports, puppet valves and igniting devices in the ports connecting the outer end of the smaller cylinder and the inner end of the larger cylinder with the said valve chest, an engine shaft connected with the said piston, a cam shaft driven from the said engine shaft, valve actuating cams on the said cam shaft, means for causing said valve actuating cams to operate the said slide valves and the said puppet valves, a contact terminal of a circuit, fixed contacts, electrical connections leading from certain of the contacts to said igniting devices, a switch arm connecting the contact terminal with certain of said fixed contacts, a cam arranged to control the movements of said switch arm, a contact arm, a spring contact, said contact arm and said spring contact connected to each other with electrical connections and forming the other terminal of the said circuit, a cam controlling pin arrangement normally in contact with said contact arm, a governor, means controlled by said governor for contacting said spring contact at times, a movable contact pin arrangement, manually-controlled means whereby said contact pin arrangement is shifted relatively to the said switch arm, and manually-controlled means whereby said cam controlling pin arrangement may be controlled.

12. An internal combustion engine comprising a cylinder, a double piston moving therein, a fluid admission chamber at one end of said cylinder, an expansion chamber at the other end of said cylinder, a fluid admission chamber intermediate the ends of said cylinder, a puppet valve coöperating with each admission chamber, two exhaust ports communicating with said chest, each of said chambers having a port communicating with said chest, a two headed valve, one head of said valve controlling the fluid admission chamber ports and one exhaust port and the other head the expansion chamber port and the other exhaust port, means for exploding fluid in the admission chambers alternately, said piston moving in the same direction when fluid is exploded alternately, means for actuating said puppet valves alternately, means controlled by said first-named valve for alternately contacting the exploded fluids against said piston to cause it to make return strokes before passing out of said exhaust ports, and means for causing said valve to move in timed relation with said puppet valves.

13. An internal combustion engine comprising a cylinder, a piston reciprocating in said cylinder, combustion chambers, a valve chest, said combustion chambers each having a channel opening into said chest, an admission channel opening into said chest, an exhaust channel, a valve moving in said chest adapted to connect certain of the first-named channels with said exhaust channel, means for adapting said valve to control the first and second-named channels, fluid being caused to pass from said admission channel through said first and second-named channels into said cylinder to cause said piston to make strokes, means for adapting said valve to evacuate fluid from the first-named channels into said exhaust channel at times, means for adapting said valve to evacuate fluid from said first-named channels into said valve chest at times and instrumentalities for causing the last-named fluid to be reutilized in said cylinder before passing to atmosphere.

14. An internal combustion engine comprising a cylinder, a piston reciprocating in said cylinder, a valve chest, a fluid mixing chamber at one end of said cylinder, a fluid mixing chamber intermediate the ends of the said cylinder, a channel at the opposite end of said cylinder, said mixing chambers and said channel opening into said cylinder and said valve chest respectively, an admission channel connected with said valve chest, an exhaust channel at said opposite end of said valve chest, an exhaust channel intermediate the ends of said valve chest, said exhaust channels connecting the valve chest with atmosphere, a two headed valve in said valve chest having a cavity in one head adapted to admit fluid from said admission channel into the first-named mixing chamber while the cavity of the other valve head is allowing exhaust fluid to pass from the first-named channel into the first-named exhaust channel during a stroke of said piston, and during the succeeding stroke of said piston said first-named valve head is adapted to allow expanding fluid to pass from the second-named mixing chamber into said valve chest and thence through the first-named channel into said cylinder, said first-named valve head carrying a means for closing communication between the second-named mixing chamber and said valve chest as said piston nears the end of said succeeding stroke and connecting the said second-named mixing chamber with said second named exhaust channel, and means for actuating said valve.

15. An internal combustion engine comprising two cylinders of different diameters, a piston having a part disposed in each cylinder, a valve chest alongside of said cylinder, a relatively-small fluid admission chamber opening into the cylinder of smaller diameter, a relatively-small fluid admission chamber opening into the cylinder of larger diameter, a channel opening into the outer end of the cylinder of larger diameter and chest respectively, a channel opening into said chest and leading to atmosphere, said admission chambers having ports opening into said chest, a two headed valve in said chest, one head of said valve being provided with a cavity and adapted to control the first and second-named channels, a fluid supply chamber opening into said chest, a second channel opening into said chest and leading to atmosphere, the other head of said valve having a cavity with ports arranged to be alternately connected with said supply chamber at times and with the first-named ports alternately at times, channelways opening into the cavity of the last-named valve head, said last-named channel being arranged to be connected with said channelways alternately, said first and second-named valve heads of said valve arranged to move in unison, and means for actuating said valve.

16. An internal combustion engine comprising a cylinder, a valve chest, a double piston moving in said cylinder, a channel opening respectively into said cylinder and said valve chest, a channel opening into said chest and the atmosphere respectively, combustion chambers, channels connecting respective combustion chambers with said valve chest, an admission channel connected with said valve chest, a valve adapted to control said channels allowing expanded fluid to pass from said cylinder through said first-named and second-named channels successively while fluid is being admitted from said admission chamber into one of said combustion chambers and in a state of combustion in the other of said combustion chambers alternately, said admitted fluid being compressed in said combustion chambers alternately while the products of combustion from the other of said combustion chambers alternately is being caused to pass through said first named channel to drive said piston in an opposite direction successively, means for reversing the travel of said piston, and means for holding said valve against movement while the reversing mechanism is actuating.

17. An engine of the kind described comprising a cylinder, a piston in said cylinder, an admission channel opening into one end of the cylinder, an admission channel intermediate the ends of and opening into said cylinder, means for conducting fluid into said channels alternately, an igniter in each admission channel, means for causing the igniter of the intermediate channel to explode the fluid therein, said exploded fluid causing said piston to reciprocate, means for causing the other igniter to explode the fluid in said other channel to cause said piston to reciprocate as soon as said first reciprocation is complete, means for controlling the fluid for reversing the travel of said piston, and manually controlled means for timing the explosion of said fluid relatively to a certain position of said piston in its direction of travel, said explosion being automatically caused to take place at a predetermined reversing speed of said engine.

18. An internal combustion engine comprising a cylinder, a piston moving in said cylinder, a fluid compression chamber opening into said cylinder at one end, a fluid compression chamber opening into said cylinder intermediate its ends, a valve chest, said chambers having inlet ports opening into said chest, puppet valves interposed between said chambers and ports, a fluid supply chamber between said ports and opening into said valve chest, slide valve in said chest arranged to connect one and then the other of said ports with said supply chamber, means for exploding the fluids alternately in said compression chambers, each volume of exploded fluid causing said piston to reciprocate, volatile matter of new fluid carbureting to a more perfect combustible mixture in said compression chambers before ignition, a shaft, means for revolving said shaft as said piston reciprocates, means controlled by said shaft for operating said puppet valves, and means for operating said slide valve controlled by said shaft.

19. An internal combustion engine comprising a cylinder, a piston moving in said cylinder, a fluid compression chamber opening into said cylinder at one end, a fluid compression chamber opening into said cylinder intermediate its ends, a valve chest, said chambers having inlet ports opening into said chest, puppet valves interposed between said chambers and ports, a fluid supply chamber between said ports and opening into said valve chest, a slide valve in said chest arranged to connect one and then the other of said ports with said supply chamber, an igniting device in each compression chamber, means whereby said igniting devices are caused to alternately explode the fluids in the compression chambers, each volume of exploded fluid causing said piston to reciprocate, volatile matter of new fluid carbureting to a more perfect combustible mixture in said compression chambers before ignition, a shaft, means for revolving said shaft as said piston reciprocates, means controlled by said shaft for operating said slide valve, means controlled by said shaft for actuating said igniting devices, and means controlled by said shaft for operating said puppet valves.

20. An internal combustion engine comprising two cylinders of two different diameters, a two-headed piston having each head in a different cylinder, an expansion chamber in one of said cylinders, a single valve controlled channel opening into said expansion chamber, a channel leading to atmosphere, a compression chamber associated with the combustion zone of each cylinder, means for conveying fluid alternately into said compression chambers, means for igniting the fluid in either compression chamber, heat generated by the ignition of said fluid in each of said compression chambers carbureting the volatile matter of new fluid admitted, means for determining the passage of the products of combustion from said compression chambers alternately into said expansion chamber, said products of combustion after expanding in said expansion chamber being caused to pass into said channel leading to atmosphere, and means for conveying any part of the products of combustion remaining in said compression chambers direct to atmosphere.

21. An internal combustion engine comprising two cylinders, a piston moving in each cylinder, means for successively conveying fluid in contact with one and then the other of said pistons on alternate strokes thereof, means for successively igniting said fluid to cause said piston to make a forward first and third stroke, means for conveying the products of combustion of said fluid in contact with another part of certain of said pistons successively, said last-mentioned fluid adapted to cause said pistons to make a return second and fourth stroke, means for dividing the last-mentioned fluid, means for exhausting a part of said divided fluid as the said piston moves in one direction, and means for exhausting a part of said divided fluid as the pistons move in an opposite direction.

22. In an internal combustion engine the combination of a channel box, a valve chamber, said channel box being formed with fluid conveying channels opening into said valve chamber and with an intermediate inlet channel opening into said valve chamber, a valve sliding in said valve chamber, said valve being formed with a continuous passage terminating in oppositely-arranged ports and with an intermediate port, said valve arranged to have its ports register with the channels of said channel box, said valve being formed with two ports opening into said continuous passage, and an outlet port in said valve chamber with which each of said second-named ports are arranged to register.

23. In an internal combustion engine, in combination a channel box, a valve chest, said channel box being formed with three passages communicating with said valve chest, a valve in said chest, said valve being formed with three ports arranged to register with said passages, two bridges formed upon said valve arranged to alternately close the center one of said passages and said bridges arranged to alternately close the outermost of said passages, said valve being formed with two ports opening into a passage connecting said three ports, said valve chest formed with an exhaust port, each of the second-named ports arranged to alternately register with said exhaust port while one of said bridges closes said center passage.

24. An engine comprising a cylinder, a fluid supply chamber formed on said cylinder, a coextensive valve chest formed laterally of said cylinder, relatively small compression chambers formed adjacent the sides of said fluid supply chamber in which new fluid is preheated before admission to the cylinder, said compression chambers communicating with said cylinder, a piston in said cylinder provided with a head closing communication between said compression chambers, a head on the opposite end of said piston, a passageway opening into said cylinder and valve chest, the last-named head of said piston closing communication between one of said compression chambers and said passageway, passageways being formed to connect said compression chambers and said valve chest, a two-headed valve in said chest, each of said heads having a cavity, said fluid supply chamber being formed with a passage adapted to admit fluid into the cavity of one of said valve heads and adapted to at all times contain a charge of fluid to rapidly supply said fluid for entry into said cavity, two valves each closing communication between respective of said compression chambers and passageways, said valve chest formed with an exhaust passageway leading out of said chest, the other head of said valve having its cavity arranged to control the first-named passageway and the exhaust passageway, an exhaust port adapted to be connected with the cavity of the first-named valve head, said first-named valve head having ports opening out of its cavity arranged to alternately connect said fluid admitting passage with one and then the other of the first-named passageways at times and ports arranged to be alternately connected with said exhaust port at times, a valve disposed in the inlet end of said supply chamber, means for actuating said valve, means for alternately operating the second-named valves, and means for operating the first-named valve.

25. In an internal combustion engine, in combination, a fluid supply chamber, a valve chest communicating with said fluid supply chamber, a valve having two heads moving in said valve chest, said valve chest having two fluid conveying passages at one end, one of said valve heads having a cavity connecting said supply chamber with one and then the other of said passages, said supply chamber adapted to be charged to rapidly supply fluid for entry into said passages, a cylinder, a piston moving in said cylinder, mixing chambers each communicating with said cylinder and a fluid conveying passage and adapted to promote a more perfect mixture of fluid preheated in said chambers by their residue heat, two valves each closing communication between one mixing chamber and one passage, said valve chest having a passage at another end thereof and opening into said cylinder and chest respectively, an exhaust passage adjacent the last-named passage and leading from said chest to atmosphere, the other valve head being formed with a cavity arranged to connect said two last-named passages at times, a valve disposed at the inlet end of said supply chamber, means for actuating said valve, means for alternately operating the second-named valves, one of said second-named valves adapted to remain open while the other is closed during two strokes of the piston in succession alternately, and means for operating said first-named valve.

26. In a device of the kind described the combination of two fluid combustion chambers, a valve chamber, said combustion chambers having separate passageways opening into said valve chamber, a chamber having a passageway midway of said first-named passageways and opening into said valve chest, a valve moving in said valve chamber and having a cavity arranged to connect said passageway with one and then another of said passageways, said passageway terminating in a relatively narrow port, and bridges arranged to alternately cover said port adapted to determine the duration of the passage of fluid into said first-named passageways and being of a greater width than said passageways.

27. In a device of the character described, the combination of two fluid combustion chambers, a valve casing, said chambers having passageways opening into said valve casing, a fluid chamber disposed between said first-named chambers and having a relatively narrow port opening into said valve casing, a valve arranged to move in said valve casing, means provided in the formation of said valve arranged to determine the duration of the pasage of fluid through said narrow port into said passageways alternately, and means provided in the formation of said valve to determine the passage of fluid out of said passageways alternately through a port controlled by said valve and leading direct to atmosphere.

28. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, and means carried by the first and second-named valves arranged to allow fluid to pass through the first and third-named channels while contacting opposite heads of the piston of two diameters.

29. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, and means carried by the first and second-named valves arranged to allow fluid to pass through the first and third-named channels while contacting opposite heads of the piston of two diameters, said second valve operated in unison with the first-named valve.

30. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, and means carried by the first and second-named valves arranged to allow fluid to pass through the first and third-named channels while contacting opposite heads of the piston of two diameters, said second valve operated in unison with the first-named valve and by the same operating means.

31. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, and a fourth channel communicating with said chest and the enlarged portion of said cylinder intermediate the ends thereof.

32. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, and a fourth channel communicating with said chest and the enlarged portion of said cylinder intermediate the ends thereof, said second valve adapted to control the passage of fluid through said fourth channel.

33. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, and means carried by the first and second-named valves arranged to allow fluid to pass through the first and fourth-named channels while contacting opposite heads of the piston of larger diameter.

34. The described engine consisting of a cylinders of two diameters, a piston of two diameters operating therein, a valve chest, a channel connecting said cylinder and valve chest whereby products of combustion may pass through said channel, an exhaust channel, means controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, and puppet valves in the third and fourth channels whereby said third and fourth channels may be closed.

35. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, and puppet valves in the third and fourth channels whereby said third and fourth channels may be closed, said puppet valves adapted to operate alternately.

36. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and th enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, and means for operating said puppet valves.

37. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, and means for operating said puppet valves, said means consisting of cams.

38. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, and shaft mounting for all said cams.

39. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, and shaft mounting for all said cams, last-named cams being arranged to cause said puppet valves to operate in appropriate unison with said slide valves.

40. The described engine consisting of a cylinder of two diameters, a piston of two diameters operating therein, a valve chest, a channel connecting said cylinder and valve chest whereby products of combustion may pass through said channels, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, and shaft mounting for all said cams, the last-named cams being arranged to cause said puppet valves to operate in appropriate unison with said slide valves, said chest having an auxiliary exhaust port and an admission port opening thereinto.

41. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, shaft mounting for all said cams, the last-named cams being arranged to cause said puppet valves to operate in appropriate unison with said slide valves, said chest having an auxiliary exhaust port and an admission port opening thereinto, and means carried by the second-named valve arranged to allow fluid to pass from said third and fourth channels alternately at times into said auxiliary exhaust port and into said third and fourth channels alternately at times from said admission port.

42. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of said cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, shaft mounting for all said cams, the last-named cams being arranged to cause said puppet valves to operate in appropriate unison with said slide valves, said chest having an auxiliary exhaust port and an admission port opening thereinto, means carried by the second-named valve arranged to allow fluid to pass from said third and fourth channels alternately at times into said auxiliary exhaust port and into said third and fourth channels at times from said admission port, and ignition means for said third and fourth channels.

43. The described engine consisting of a cylinder of two diameters, a piston of two diameters operating therein, a valve chest, a channel connecting said cylinder and valve chest whereby products of combustion may pass through said channel, an exhaust channel, means for controlling the passage of the products of combustion through said channels, said means consisting of a slide valve mechanism, a valve of said mechanism adapted to connect said channels at times, means for reciprocating the valve of said valve mechanism, said means consisting of a cam wheel, the first-named channel communicating with an outer end of said cylinder, a third channel connected with said cylinder at another end thereof whereby the products of combustion may pass from said cylinder, said third channel communicating with said chest, a second valve adapted to control the passage of fluid through said third channel, means carried by the first and second-named valves arranged to allow fluid to pass through the first and third-named channels while contacting opposite heads of the piston of two diameters, said second valve operated in unison with the first-named valve and by the same operating means, a fourth channel communicating with said chest and the enlarged portion of the cylinder intermediate the ends thereof, said second valve adapted to control the passage of fluid through said fourth channel, means carried by the first and second-named valves arranged to allow fluid to pass through the first and fourth-named channels while contacting opposite heads of the piston of larger diameter, puppet valves in the third and fourth channels whereby said third and fourth channels may be closed, said puppet valves adapted to operate alternately, means for operating said puppet valves, said means consisting of cams, shaft mounting for all said cams, the last-named cams being arranged to cause said puppet valves to operate in appropriate unison with said slide valves, said chest having an auxiliary exhaust port and an admission port opening thereinto, means carried by the second-named valve arranged to allow fluid to pass from said third and fourth channels alternately at times into said auxiliary exhaust port and into said third and fourth channels alternately at times from said admission port, and ignition means for said third and fourth channels, said first-named valve adapted to permit the expanded products of combustion to pass out of said first-named channels and said exhaust channel successively during the major part of strokes of said piston in one direction and said second-named valve adapted to permit the remaining products of combustion to pass out of said third and fourth channels alternately into said auxiliary exhaust port during the minor part of strokes of said piston in an opposite direction.

44. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, and puppet valves adapted to form closures in certain of said channels.

45. The described device consisting of an internal combustion engine having a cylinder of two diameters, a piston of two diameters operating therein, channels whereby the products of combustion may pass from one end to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, and means whereby said puppet valves are operated.

46. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, and means whereby said puppet valves are operated in time with the movement of said slide valve.

47. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, and a shaft adapted to be driven by said piston.

48. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, and a shaft adapted to be driven by said piston, said shaft adapted to drive said driving means.

49. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valve adapted to form closures in certain of said channels, means whereby said puppet valves are operated in time with the movement of said slide valve, a shaft adapted to be driven by said piston, said shaft adapted to drive said driving means, and means to permit said ignition means to be operated alternately.

50. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, a shaft adapted to be driven by said piston, said shaft adapted to drive said driving means, and means to permit said ignition means to be operated alternately, said means consisting of a switch.

51. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, a shaft adapted to be driven by said piston, said shaft adapted to drive said driving means, and means to permit said ignition means to be operated alternately, said means consisting of a switch, said driving means adapted to perate said switch.

52. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, a shaft adapted to be driven by said piston, said shaft adapted to drive said driving means, means to permit said ignition means to be operated alternately, said means consisting of a switch, said driving means adapted to operate said switch, and manually controlled means whereby the flow of electric energy through said switch may be interrupted at times.

53. The described device consisting of an internal combustion engine having a cylinder of two diameters, a piston of two diameters operating therein, channels whereby the products of combustion may pass from one to the other end of said cylinder and channels whereby the products of combustion may pass from an intermediate portion to an end of said cylinder, a valve chest with which said channels communicate, a slide valve adapted to close communication between certain of said channels and said chest and open communication between certain of said channels and said chest, ignition means in certain of said channels, puppet valves adapted to form closures in certain of said channels, means whereby said puppet valves are operated in time with the movement of said slide valve, a shaft adapted to be driven by said piston, said shaft adapted to drive said driving means, means to permit said ignition means to be operated alternately, said means consisting of a switch, said driving means adapted to operate said switch, and manually controlled means whereby the flow of electric energy through said switch may be interrupted at times and whereby the rotation of the said shaft of said engine may be reversed.

In testimony whereof I have signed my name to this specification in the presence of two subscribing witnesses.

WILLIAM T. SMITH.

Witnesses:
 A. JAMES HOLT,
 CHAS. W. SKILLMAN.